(12) United States Patent  
Jung et al.

(10) Patent No.: US 8,731,543 B2
(45) Date of Patent: May 20, 2014

(54) METHOD AND APPARATUS FOR REPORTING A LOGGED MEASUREMENT IN A WIRELESS COMMUNICATION SYSTEM

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/700,107

(22) PCT Filed: May 25, 2011

(86) PCT No.: PCT/KR2011/003821
§ 371 (c)(1),
(2), (4) Date: Nov. 26, 2012

(87) PCT Pub. No.: WO2011/149262
PCT Pub. Date: Dec. 1, 2011

(65) Prior Publication Data
US 2013/0072182 A1    Mar. 21, 2013

Related U.S. Application Data

(60) Provisional application No. 61/348,710, filed on May 26, 2010.

(51) Int. Cl.
*H04W 24/00* (2009.01)
(52) U.S. Cl.
USPC ........ 455/423; 455/422.1; 455/424; 455/425; 455/429; 455/436

(58) Field of Classification Search
None
See application file for complete search history.

(56) References Cited

U.S. PATENT DOCUMENTS

2011/0199923 A1* 8/2011 Persson et al. ................ 370/252
2011/0201279 A1* 8/2011 Suzuki et al. .............. 455/67.11

OTHER PUBLICATIONS

ETSI MCC, "Draft Report of 3GPP TSG RAN WG2 Meeting #70bis", 3GPP TSG-RAN Working Group 2 Meeting #71, R2-10xxxx, Aug. 2010, 137 pages (relevant pp. 13-14).
Pantech, "Periodic and Event Triggered MDT Reporting", 3GPP TSG-RAN WG2 Meeting #71bis, R2-105791, Oct. 2010, 2 pages (relevant p. 1).
3rd Generation Partnership Project (3GPP), "Technical Specification Group Radio Access Network; Evolved Universal Terrestrial Radio Access (E-UTRA); Radio Resource Control (RRC); Protocol specification (Release 9)," 3GPP TS 36.331 V9.2.0, Mar. 2010, 248 pages.
Catt, "Handling of the Log Available Indication," 3GPP TSG RAN WG2 Meeting #70, R2-102793, May 2010, 2 pages.
Korean Intellectual Property Office Application Serial No. 10-2012-7030571, Office Action dated Feb. 19, 2014, 4 pages.

* cited by examiner

*Primary Examiner* — Suhail Khan
(74) *Attorney, Agent, or Firm* — Lee, Hong, Degerman, Kang & Waimey

(57) ABSTRACT

The present invention relates to a method and apparatus for reporting a logged measurement in a wireless communication system. A terminal receives a minimization of drive tests (MDT) configuration from a cell of a first radio access technology (RAT), and logs a measurement based on the MDT configuration so as to collect the logged measurements. The terminal transmits a logging indicator, which indicates the availability of the logged measurements, to a cell of a second RAT.

8 Claims, 14 Drawing Sheets

METHOD AND APPARATUS FOR REPORTING A LOGGED MEASUREMENT IN A WIRELESS COMMUNICATION SYSTEM

CROSS-REFERENCE TO RELATED APPLICATIONS

This application is the National Stage filing under 35 U.S.C. 371 of International Application No. PCT/KR2011/003821, filed on May 25, 2011, which claims the benefit of U.S. Provisional Application Ser. No. 61/348,710, filed on May 26, 2010, the contents of all of which are hereby incorporated by reference herein in their entireties.

TECHNICAL FIELD

The present invention relates to a wireless communication and, more particularly, to a method and an apparatus for reporting logged measurements in a wireless communication system.

BACKGROUND ART

A 3rd generation partnership project (3GPP) long term evolution (LTE) which is an improved universal mobile telecommunications system (UMTS) is introduced as 3GPP release 8. The 3GPP LTE uses orthogonal frequency division multiple access (OFDMA) in downlink and uses single carrier-frequency division multiple access (SC-FDMA) in uplink. A multiple input multiple output (MIMO) having maximum four antennas is employed. Recently, a discussion on LTE-Advanced (LTE-A) which is evolved 3GPPP LTE is being developed.

A minimization of driving tests (MDT) is to test by operators for coverage optimization by using a terminal instead of a vehicle. The coverage is varied according to a location of a base station, an arrangement of neighboring buildings, and a use environment of a user. Therefore, the operator needs to periodically perform a driving test, which consumes a lot of cost and resources. The MDT measures the coverage by the operator using the terminal.

The operator may draft a coverage map indicating availability of a service over an overall service area of the operator and distribution of a quality of the service by summarizing the MDT measurement received from a plurality of terminals, thereby utilizing the coverage map for operating and optimizing the network. For example, when a coverage problem of a particular area is reported from the terminal, the operator may increase transmission power of the base station which provides a service to the corresponding area to expand the coverage of a corresponding cell.

Generally, evolution of the network and evolution/replacement of the terminal are gradually carried out. As a result, it is more common that a heterogeneous network in which a plurality of RATs coexists is disposed rather than a homogeneous network in which a single radio access technology (RAT) is used. Also, a terminal which supports the heterogeneous network is widely distributed.

The RAT refers to a wireless technology based on a specific standardization. Specifically, the RAT includes GSM EDGE Radio Access Network (GERAN), Universal Terrestrial Radio Access Network (UTRAN), and Evolved-UTRAN (E-UTRAN).

In order for the terminal to receive an optimized service in the heterogeneous network, a wireless environment of the heterogeneous network also needs to be optimized. However, optimizing RATs having a widely different service area or channel characteristic is not easy.

Due to a characteristic of the MDT which is performed for optimizing the service, the measurement of various RAT needs to be identified.

DISCLOSURE

Technical Problem

The present invention provides a method and an apparatus for reporting logged measurements in a heterogeneous network.

Technical Solution

In an aspect, a method of reporting logged measurements in a wireless communication system is provided. The method includes receiving, by a user equipment, a minimization of drive tests (MDT) configuration from a cell of a first radio access technology (RAT), logging, by the user equipment, measurements based on the MDT configuration in order to collect the logged measurements, and transmitting, by the user equipment, a logging indicator indicating an availability of the logged measurements to a cell of a second RAT.

The user equipment may log the measurements in a radio resource control (RRC) idle mode.

The logging indicator may indicate the first RAT at which the MDT configuration is received.

The method may include receiving, by the user equipment, a reporting request for reporting the logged measurements from the cell of the second RAT, and transmitting, by the user equipment, a measurement result including the logged measurements to the cell of the second RAT in response to the reporting request.

In another aspect, a wireless apparatus for reporting logged measurements in a wireless communication system is provided. The wireless apparatus includes a radio frequency (RF) unit configured to transmit and receive a radio signal, and a processor operably connected to the RF unit and configured to receive a minimization of drive tests (MDT) configuration from a cell of a first radio access technology (RAT), log, measurements based on the MDT configuration in order to collect the logged measurements, and transmit a logging indicator indicating an availability of the logged measurements to a cell of a second RAT.

Advantageous Effects

A terminal which supports multiple RATs may report logged measurement with various RAT to a base station. Even if the RAT is changed due to mobility of the terminal or a change to a service, the terminal may continue to perform MDT measurement and reporting thereof, thereby assisting to optimize a network.

MODE FOR INVENTION

Figure 1:
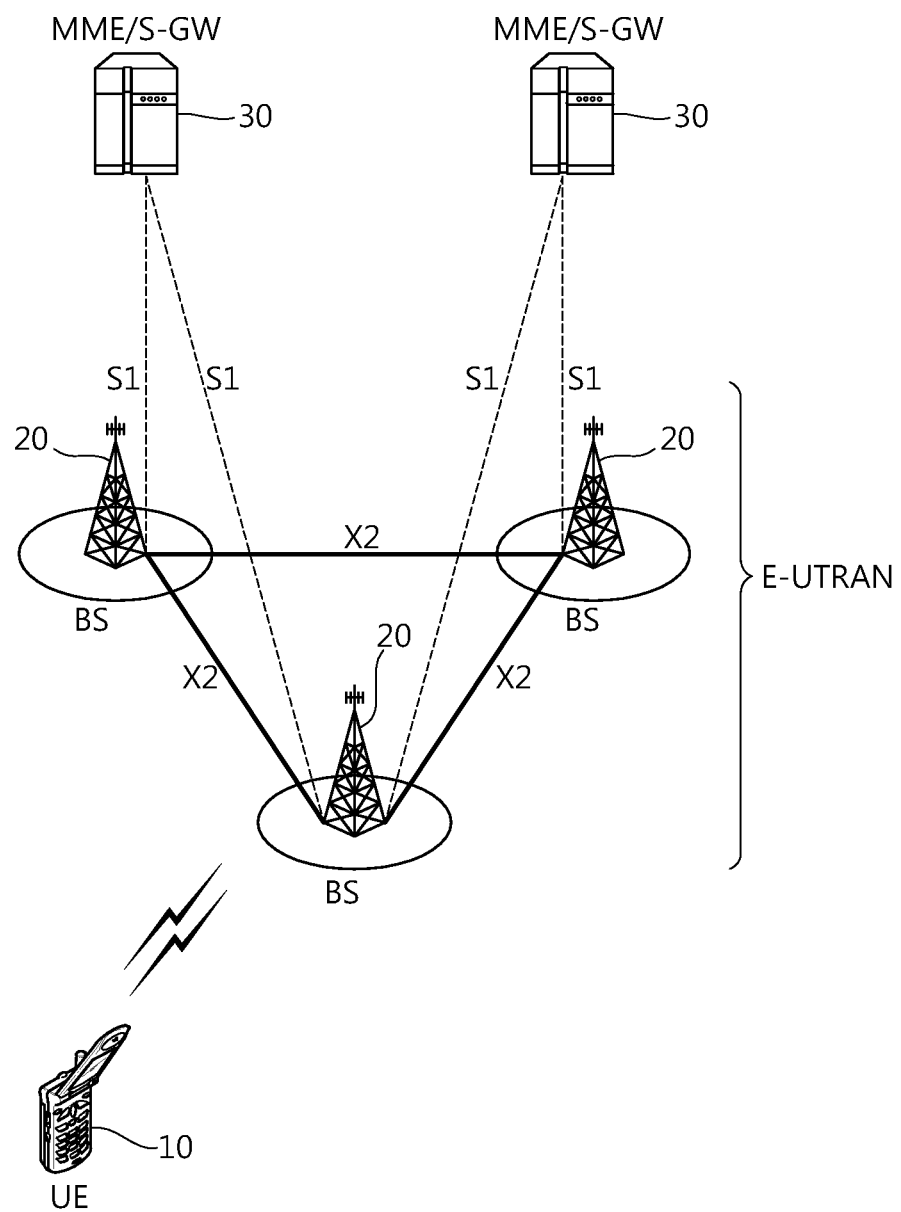
FIG. 1 illustrates a wireless communication system to which the present invention applies.

FIG. 1 illustrates a wireless communication system to which the present invention applies. This may also be called as E-UTRAN (Evolved-UMTS Terrestrial Radio Access Network) or LTE (Long Term Evolution)/LTE-A system.

The E-UTRAN includes a base station (BS) 20 which provides a control plane and a user plane to user equipment (UE) 10. The UE 10 may be fixed or mobile, and may be referred to as a MS (Mobile station), an UT (User Terminal), a SS (Subscriber Station), an MT (Mobile Terminal) and a wireless device. The base station refers to a fixed station which communicates with the UE 10 and may be referred to as another terminology such as an eNB (evolved-NodeB), a BTS (Base Transceiver System), and an access point.

The base station 20 may be connected to each other through an X2 interface. The base station 20 is connected to an EPC (Evolved Packet Core) 30 through the S1 interface, and more particularly, to a S-GW (Serving Gateway) through an S1-MME through an MME (Mobility Management Entity) and S1-U.

The EPC 30 comprises the MME, the S-GW and a P-GW (Packet Data Network Gateway). The MME has information about connection information of a UE or a capacity of the UE, and such information is used primarily for managing mobility of the UE. The S-GW is a gateway having the E-UTRAN as an endpoint thereof, and the P-GW is a gateway having a PDN as an endpoint thereof.

Layers of a radio interface protocol between the UE and the network may be divided into L1 (a first layer), L2 (a second layer) and L3 (a third layer) based on lower three layers of a reference model of an open system interconnection (OSI) well known in a communication system, and a physical layer which belongs to the first layer provides an information transfer service using a physical channel, and a radio resource control (RCC) layer located in the third layer performs a role of controlling a radio resource between the UE and the network. To this end, the RRC layer is used to exchange an RRC message between the UE and the base station.

Figure 2:
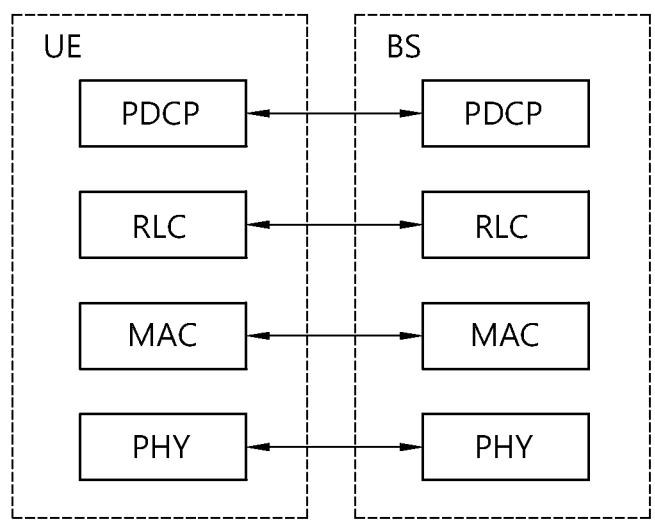
FIG. 2 is a block diagram illustrating a radio protocol architecture with respect to a user plane.
Figure 3:
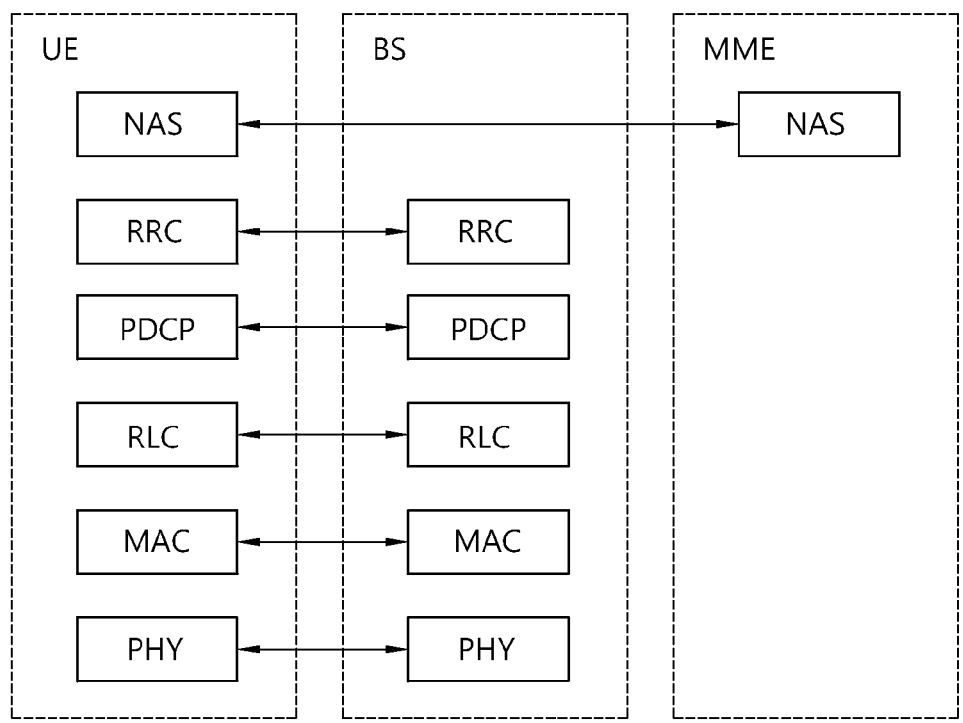
FIG. 3 is a block diagram illustrating a radio protocol architecture with respect to a control plane.

FIG. 2 is a block diagram illustrating a radio protocol architecture with respect to a user plane. FIG. 3 is a block diagram illustrating a radio protocol architecture with respect to a control plane. The data plane is a protocol stack for transmitting a user data, and the control plane is a protocol stack for transmitting a control signal.

Referring to FIGS. 2 and 3, the physical layer (PHY) provides the information transfer service to an upper layer by using the physical channel. The physical channel is connected to an MAC (Medium Access Control) layer, which is an upper layer, through a transport channel. A data is moved between the MAC layer and the physical layer through the transport channel. The transport channel is classified according to how and in which characteristic a data is transmitted through a radio interface.

A data is moved between different physical layers, i.e., between physical layers of a transmitter and a receiver. The physical channel may be modulated in OFDM (Orthogonal Frequency Division Multiplexing) method, while utilizing a time and a frequency as the radio resource.

A function of the MAC layer includes mapping between a logic channel and the transport channel and multiplexing/demultiplexing to a transport block provided as the physical channel on the transport channel of an MAC SDU (service data unit) which belongs to the logic channel. The MAC layer provides a service to a radio lank control (RLC) layer through the logic channel.

A function of the RLC layer includes concatenation, segmentation, and reassembly of an RLC SDU. To ensure various QoS (Quality of Service) required by a radio bearer (RB), the RLC layer provides three operation modes such as a transparent mode (TM), an unacknowledged mode (UM), and an acknowledged mode (AM). An AM RLC provides error correction through ARQ (automatic repeat request).

A function of a PDCP (Packet Data Convergence Protocol) layer in the user plane includes delivery of the user data, header compression, and ciphering. The function of the PDCP layer in the user plane includes delivery of a control plane data and ciphering/integrity protection.

The RRC (Radio Resource Control) layer is defined only in the control plane. The RRC layer is responsible for controlling the logic channel, the transport channel, and the physical channels in association with configuration, re-configuration, and release of the radio bearers. The PB means a logical path provided by the first layer (PHY layer) and the second layer (the MAC layer, the RLC layer, the PDCP layer) for data transmission between the UE and the network.

Setting of the PB means a process of defining a characteristic of the radio protocol layer and the channel in order to provide a specific service and a process of setting respective specific parameters thereof and an operation method. The RB may be again divided into two of SRB (Signaling RB) and DRB (Data RB). The SRB is used as a path for transmitting the RRC message in the control plane and the DRB is used as a path for transmitting the user data in the user plane.

When an RRC connection is established between the RRC layer of the UE and the RRC layer of the E-UTRAN, the UE is in an RRC connection state, and when the RRC connection is not established, the UE is in an RRC idle state.

A downlink transmission channel for transmitting a data from the network to the UE includes BCH (Broadcast Channel) for transmitting system information and a downlink SCH (Shared Channel) for transmitting user traffic or a control message. A downlink multicast or a traffic of a broadcast service or the control message may be transmitted through the downlink SCH or through a separate downlink MCH (Multicast Channel). On the other hand, an uplink transmission transmit for transmitting a data from the UE to the network may include an RACH (Random Access Channel) for transmitting an initial control message and an uplink SCH (Shared Channel) for transmitting the user traffic or the control message.

The logical channel located above the transmission channel and mapped to the transport channel includes BCCH (Broadcast Control Channel), PCCH (Paging Control Channel), CCCH (Common Control Channel), MCCH (Multicast Control Channel), MTCH (Multicast Traffic Channel), etc.

The physical channel consists of multiple OFDM symbols in time domain and multiple sub-carriers in frequency domain. One sub-frame consists of a plurality of OFDM symbols in the time domain. A resource block is a resource allocation unit and consists of a plurality of OFDM symbols and a plurality of sub-carriers. In addition, each sub-frame may use PDCCH (Physical Downlink Control Channel), i.e., specific OFDM symbol (for example, a first OFDM symbol) of a corresponding sub-frame for an L1/L2 control channel. TTI (Transmission Time Interval) is a unit interval of transmitting the sub-frame.

Hereinafter, an RRC state and an RRC connection method of the UE will be described.

The RRC state indicates whether the RRC layer of the UE has a logical connection with the RRC layer of the E-UTRAN, and if the two are connected, the RRC state is referred to as the RRC connection state, and if the two are not connected, referred to as the RRC idle state. Since the UE in the RRC connection state has the RRC connection, the E-UTRAN may identify an existence of a corresponding UE in unit of a cell, and therefore, the UE may be effectively controlled. On the other hand, the UE in the RRC idle sate may not be identified by the E-UTRAN and managed by a CN (core network) in unit of a tracking area, which is larger than the cell. In other words, the UE in the RRC idle state may be identified only about the existence thereof in unit of a large area and the UE needs to move to the RRC connection state in order to receive a common mobile communication service such as a voice or a data.

When a user first turns on a power of the UE, the UE first navigates an appropriate cell and stays in the RRC idle sate. The UE in the RRC idle state establishes the RRC connection with the E-UTRAN through an RRC connection procedure only when there is a need for establishing the RRC connection and transitions to the RRC connection state. Various cases exists where the UE in the RRC idle state needs to establish the RRC connection, e.g., uplink data transmission is necessary for a reason of, for example, the user's call attempt, or a paging message is received from the E-UTRAN and a response message is transmitted in response thereto.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME. Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When the UE in the ECM-IDLE has RRC connection with the E-UTRAN, a corresponding UE is in the ECM-CONNECTED state. When the MME in the ECM-IDLE state has an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a mobility related procedure based on the UE such as cell selection or cell re-selection without a need for receiving a command from the network. On the other hand, when the UE is in the ECM-CONNECTED state, the mobility of the UE is managed by the command from the network. When a location of the UE in the ECM-IDLE state is different from a location known by the network, the UE notifies a corresponding location of the UE to the network through a tracking area updating procedure.

Next, system information is described.

The system information includes essential information which must be known in order for the UE to connect to the base station. Therefore, the UE must receive all the system information before the UE is connected to the base station system, and also the UE needs to have the most recent system information. Since the system information is the information which must be known by all UEs within a cell, the base station periodically transmits the system information.

According to Section 5.2.2 of 3GPP TS 36.331 V8.7.0 (2009-09) "Radio Resource Control (RRC) Protocol specification (Release 8)," the system information is divided into MIB (Master Information Block), SB (Scheduling Block) and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public use service of a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell selection criteria.

2) Suitable cell: a cell in which the UE may be provided with a regular service. This cell satisfies a condition for the acceptable cell while satisfying additional conditions at the same time. The additional conditions are that this cell must belong to a PLMN to which a corresponding UE can connect and must be a cell in which performing the tracking area updating procedure of the UE is not prohibited. If the corresponding cell is a CSG cell, this cell must be a cell to which the UE can connect to as a CSG member.

3) Barred cell: a cell which broadcasts information that the cell is barred through the system information 4) Reserved cell: a cell which broadcasts information that the cell is reserved through the system information.

Hereinafter, measurement and measurement reporting are described.

Support for the mobility of the UE is essential in a mobile communication system. Therefore, the UE continuously measures a quality of a serving cell which currently provides a service and a quality of a surrounding cell. The UE reports the measurement result to the network at an appropriate time, and the network provides an optimal mobility to the UE through, e.g., a handover.

In order to provide information which can assist the operator in operating the network, other than a purpose for supporting the mobility, the UE may perform measurement for a specific purpose set by the network and report the measurement result to the network. For example, the UE receives broadcast information of a specific cell set by the network. The UE may report a cell identity (referred to as a global cell identity) of the specific cell, identification information of a location to which the specific cell belongs (e.g., a tracking area code), and/or other cell information (e.g., membership of the CSG (Closed Subscriber Group) cell) to the serving cell.

When it is identified that a quality of the UE in motion in a specific area is very poor based on the measurement, the location information of cells having a poor quality and the measurement result may be reported to the network. The network may seek to optimize the network based on the reporting of the measurement result of UEs which assist the operation of the network.

In a mobile communication system of which frequency reuse factor is 1, a communication is performed between different cells in a frequency band having similar mobility in most part. Therefore, in order to sufficiently secure the mobility of the UE, the UE needs to be capable of measuring a quality of surrounding cells having the same center frequency as a center frequency of the serving cell and cell information thereof. Thus, measurement of a cell having the same center frequency as the center frequency of the serving cell is called an intra-frequency measurement. The UE performs the intra-frequency measurement and reports the measurement result to the network at an appropriate time to achieve an objective of a corresponding measurement result.

The mobile communication operator may operate the network by using a plurality of frequency bands. In a case where a service of the communication system is provided through the plurality of the frequency bands, in order to secure optimal mobility of the UE, the UE needs to be capable of measuring a quality of surrounding cells having a center frequency different from a center frequency of the serving cell and cell information thereof. Thus, measurement of a cell having the center frequency different from the center frequency of the serving cell is called an inter-frequency measurement. The UE needs to perform the inter-frequency measurement and report the measurement result to the network at an appropriate time.

When the UE supports the heterogeneous network, a measurement of a cell in the heterogeneous network may be performed by a setting of the base station. Such measurement on the heterogeneous network is called an inter-RAT (Radio Access Technology) measurement. For example, the RAT may include UTRAN (UMTS Terrestrial Radio Access Network) and GERAN (GSM EDGE Radio Access Network) which are compliant to a 3GPP standard and may also include a CDMA 2000 system which is compliant to a 3GPP2 standard.

Figure 4:
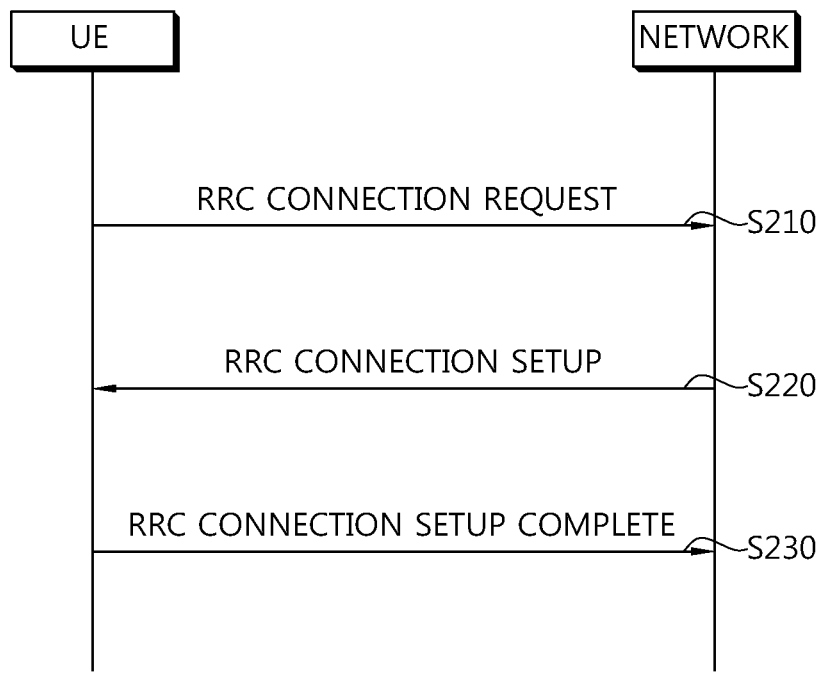
FIG. 4 is a flow chart illustrating a process of establishing a radio resource control (RRC) connection.

FIG. 4 is a flow chart illustrating a process of establishing a RRC connection.

A UE sends an RRC connection request message requesting an RRC connection to the network (S210). The network sends an RRC connection setup message in response to the RRC connection request (S220). Upon receiving the RC connection setup message, the UE enters into an RRC connection mode.

The UE sends an RRC connection setup complete message which is used to verify successful completion of establishing the RRC connection to the network (S230).

An RRC connection re-establishment is performed similarly to an RRC connection establishment. The RRC connection re-establishment is to re-establish the RRC connection, and is related to re-starting an SRB1 operation, re-activating security, and setting a primary cell (PCell). The UE sends an RRC connection re-establishment request message requesting re-establishment of the RRC connection to the network. The network sends an RRC connection re-establishment message in response to the RRC connection re-establishment request. The UE sends an RRC connection re-establishment complete message in response to the RRC connection re-establishment.

Figure 5:
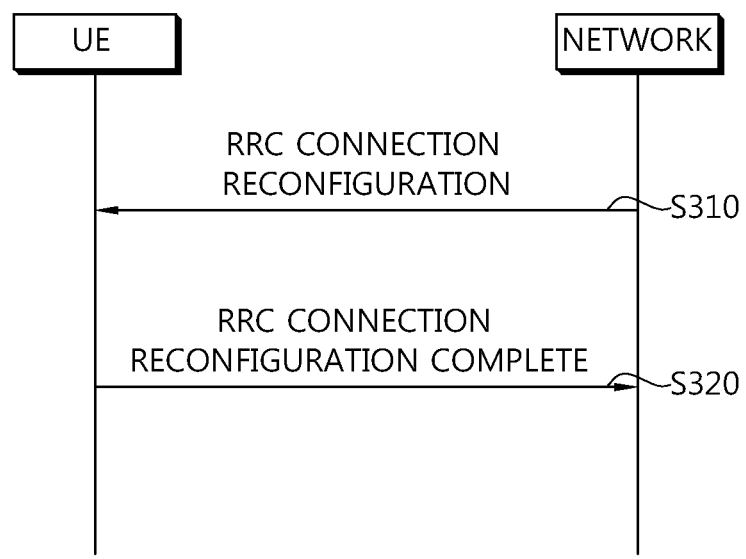
FIG. 5 is a flow chart illustrating a process of re-configuring an RRC connection.

FIG. 5 is a flow chart illustrating a process of re-configuring an RRC connection. The RRC connection reconfiguration is used to modify the RRC connection. The RRC reconfiguration is used to establish/modify/release the RB, perform a handover, and setup/modify/release measurement.

The network sends an RRC connection reconfiguration message to the UE to modify the RRC connection (S310). The UE sends an RRC connection reconfiguration complete message to the network in order to verify a successful completion of the RRC connection reconfiguration in response to the RRC connection reconfiguration (S320).

Figure 6:
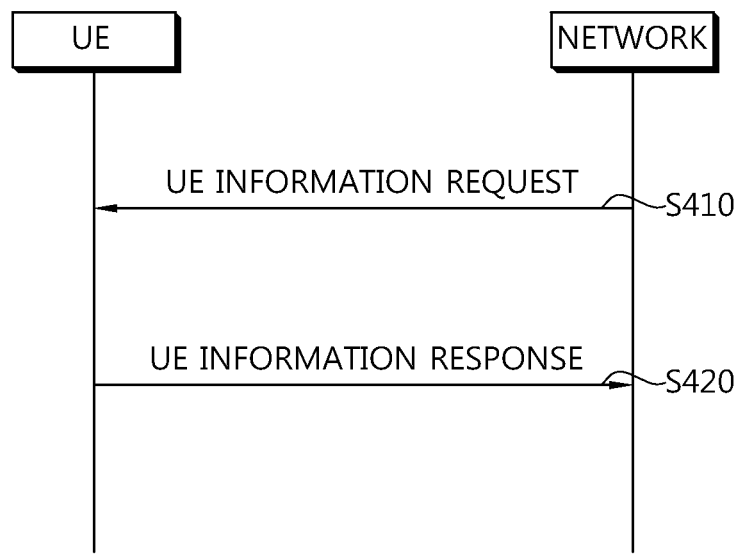
FIG. 6 is a flow chart illustrating a process of reporting terminal information.

FIG. 6 is a flow chart illustrating a process of reporting UE information.

A network sends an UE information request message to the UE in order to obtain the UE information (S410). The UE information request message includes a field indicating whether the UE reports information about a random access process and/or a radio link failure. The UE information request message includes a field indicating whether the UE reports the logged measurement.

The UE sends an UE information response message including information requested by the UE information request to the network (S420).

Here, the minimization of driving tests (MDT) is described.

The MDT is to test by operators for coverage optimization by using a UE instead of a vehicle. The coverage is varied according to a location of a base station, an arrangement of a neighboring building, and a use environment of a user. Therefore, the operator needs to periodically perform a driving test, which consumes a lot of cost and resources. The MDT measures the coverage by the operator using the UE.

The MDT may be divided into a logged MDT and an immediate MDT. According to the logged MDT, the UE performs the MDT measurement and transmits the logged measurement to the network at a particular time point. According to the immediate MDT, the UE performs the MDT measurement and transmits the measurement to the network when a reporting condition is satisfied. The logged MDT performs the MDT measurement in the RRC idle mode, wherein the immediate MDT performs the MDT measurement in the RRC connection mode.

Figure 7:
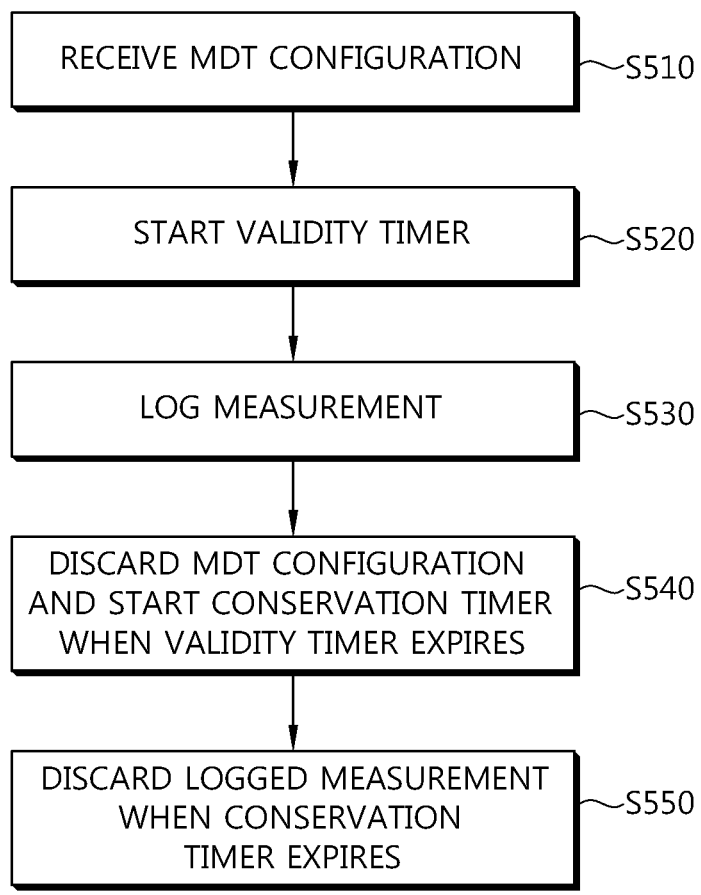
FIG. 7 illustrates a process of performing a conventional minimization of driving tests (MDT).

FIG. 7 illustrates a process of performing a conventional minimization of driving tests (MDT).

A UE receives a MDT configuration from the network (S510). The UE is in the RRC connection mode in which the RRC connection with the serving cell is established. Even when the RRC mode transits to the RRC idle mode, the MDT configuration is maintained, and accordingly, the MDT measurement result is also maintained.

The MDT configuration may include at least one of a logging interval, a reference time and an area configuration. The logging interval indicates a period for storing the measurement result. The reference time is used to indicate a reference time used when the UE transmits the logged measurement. The area configuration indicates an area in which the UE is requested to perform the logging.

Upon receiving the MDT configuration, the UE starts a validity timer (S520). The validity timer indicates a lifetime of the MDT configuration. A value of the validity timer may be included in the MDT configuration. Such value is called a logging duration. When the UE receives the MDT configuration, the UE sets the value of the validity timer as the logging duration and starts the validity timer.

The UE switches to the RRC idle mode and then logs the measurement based on the MDT configuration during when the validity timer is operated (S530). For example, the MDT measurement is performed every logging period within the MDT configuration. The MDT measurement value may be a value well known to a person of ordinary skill in the art such as RSRP (Reference Signal Received Power), RSRQ (Reference Signal Received Quality), RSCP (received signal code power), Ec/No.

When the validity timer expires, the UE discards the MDT configuration and starts a conservation timer (S540). The UE discards the MDT configuration and stops the MDT measurement. However, the logged measurement is maintained. The conservation timer indicates a lifetime of the logged measurement.

When the conservation timer expires, the logged measurement is discarded (S550). When a reporting request of the logged measurement is received from the base station during when the conservation timer is operated, the UE may report the logged measurement.

A value of the conservation timer may be fixed. For example, the value of the conservation timer may be 48 hours. Alternatively, the value of the conservation timer may be included in the MDT configuration such that the base station may notify the value to the UE.

When a new MDT configuration is received, the MDT configuration is updated to a new MDT configuration and the validity timer is restarted. Also, the MDT measurement previously logged according to the previous MDT configuration is discarded.

When there are the logged MDT measurements, the UE may send an availability of the logged measurement to the base station when the UE switches from the RRC idle mode to the RRC connection mode. The UE may send the availability of the logged measurement to the network when the RRC connection is established, re-established, or re-configured.

The network which receives that the logged MDT measurement exists from the UE may request the UE to transmit the logged MDT measurement. The network which learns about the logged measurement transmits an information request for requesting the reporting of the logged measurement to the UE. The UE transmits an information response including the logged measurement to the network.

A content measured by the UE during when the MDT measurement is performed is primarily related to a wireless environment. The MDT measurement may include a cell identifier, a signal quality of a cell and/or a signal strength. The MDT measurement may include a measurement time and a measurement location.

Generally, evolution of the network and evolution/replacement of the UE are gradually carried out. As a result, it is more common that a heterogeneous network in which a plurality of RATs coexists is disposed rather than a homogeneous network in which a single radio access technology (RAT) is used.

The RAT refers to a wireless technology based on a specific standardization. Specifically, the RAT includes GERAN (GSM EDGE Radio Access Network), UTRAN (Universal Terrestrial Radio Access Network), and E-UTRAN (Evolved-UTRAN).

In order for the UE to receive an optimized service in the heterogeneous network, a wireless environment of the heterogeneous network also needs to be optimized. However, optimizing RATs having a widely different service area or channel characteristic is not easy.

According to the conventional MDT, the UE may perform measurement only in the RAT which receives the measurement setting and report the measurement result only with respect to a corresponding RAT. Due to such a limitation, when the UE moves to another RAT for a better optimized service, the UE stops the MDT measurement. The reporting of the MDT is also stopped.

However, due to a characteristic of the MDT which is performed for optimizing the service, the measurement of another RAT needs to be identified.

According to the proposed invention, the network may set the measurement setting independently for each RAT of the UE. The UE may respectively receive the measurement setting from different RATs and independently store the logged measurement.

Figure 8:
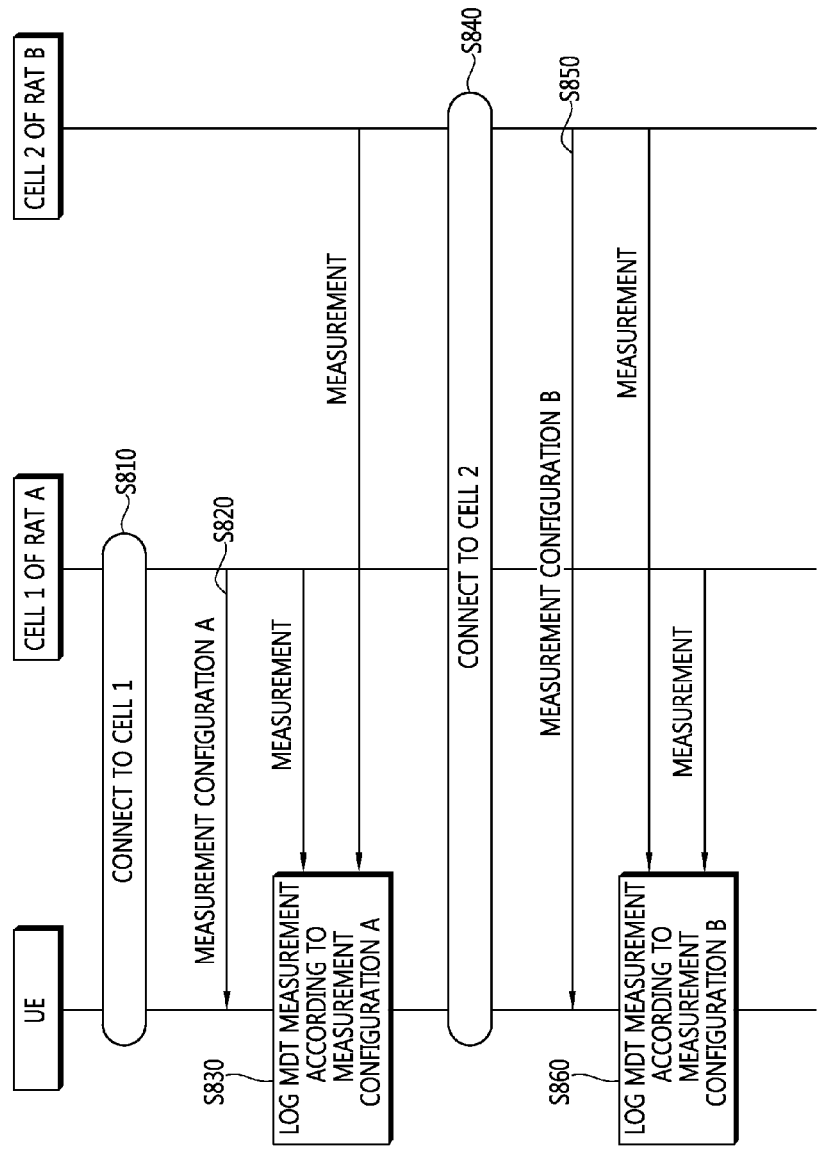
FIG. 8 is a flow chart illustrating a method of reporting logged information according to an exemplary embodiment of the present invention.

FIG. 8 is a flow chart illustrating a method of reporting logged information according to an exemplary embodiment of the present invention.

The UE is connected to a cell 1 which uses RAT A (S810). The UE receives a measurement configuration A from the cell 1 (S820). The measurement configuration A is an MDT measurement configuration received from the RAT A. The measurement configuration A may include setting about measurement at the RAT A and may also include a setting about measurement at another RAT. Hereinafter, it is assumed that the measurement configuration includes measurement configuration for the RAT A and the RAT B.

The UE switches into the RRC idle mode and then logs the measurement of the RAT A and the RAT B according to the measurement configuration A (S830).

Next, as the UE moves, the UE is connected to a cell 2 which uses the RAT B (S840). The UE receives a measurement configuration B from the cell 2 (S850). The UE does not discard but maintains a measurement result according to the measurement configuration A. However, the previous measurement configuration A is overwritten by the measurement configuration B. When the UE which already has the measurement configuration A receives the measurement configuration B, the cell 2 may include an indicator indicating whether to delete the previous measurement configuration A in the measurement configuration B.

The UE switches into the RRC idle mode and then logs the measurement of the RAT A and the RAT B according to the measurement configuration B (S860).

The UE receives respective measurement configurations from a plurality of RATs to log the measurement. Therefore, the network may set the measurement about another RAT supported by the UE and conserve the previously logged measurement.

Figure 9:
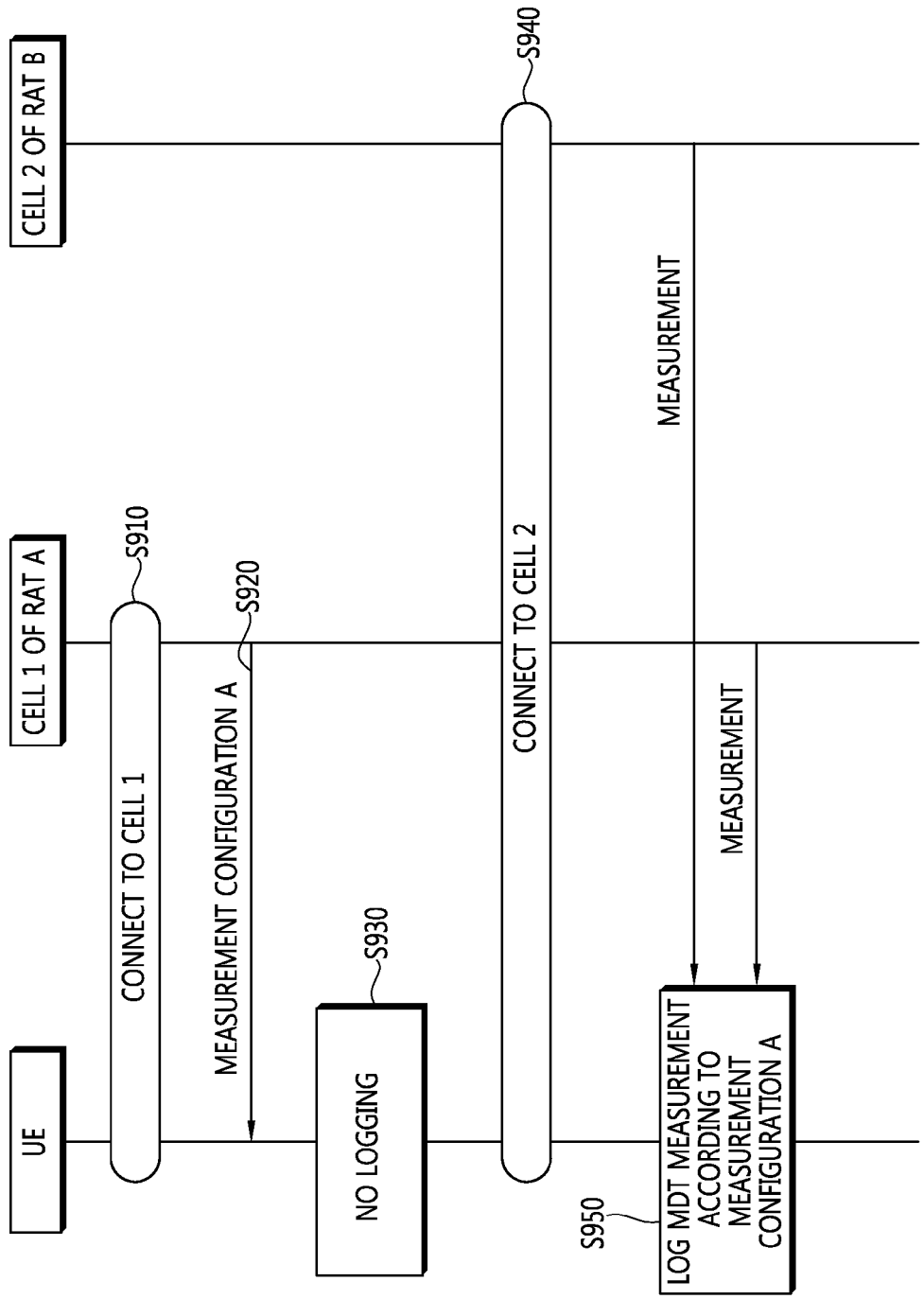
FIG. 9 is a flow chart illustrating a method of reporting logged information according to another exemplary embodiment of the present invention.

FIG. 9 is a flow chart illustrating a method of reporting logged information according to another exemplary embodiment of the present invention. FIG. 9 shows an example for designating an RAT to which the measurement configuration is to apply.

The UE is connected to the cell 1 using the RAT A (S910). The UE receives the measurement configuration A from the cell 1 (S920). Although the measurement configuration A is received from the RAT A, the measurement configuration A includes a configuration about measurement at the RAT B, not the RAT A.

The measurement configuration A may include RAT identification information indicating which RAT is associated with the measurement configuration A. The RAT identification information may be an RAT identifier or a frequency information (e.g., absolute radio-frequency channel number (AFRCN)).

After the UE switches to the RRC idle mode, the UE does not log the measurement at the RAT A according to the measurement configuration A (S930).

Next, as the UE moves, the UE is connected to the cell 2 which uses the RAT B (S940). Although a separate measurement configuration is not received from the cell 2, the UE logs the measurement of the RAT A and the RAT B according to the measurement configuration A (S950).

When the UE has the logged measurement according to the measurement configuration and the UE is connected to a new RAT instead of the RAT which receives the measurement configuration, the UE may send a logging indicator informing the existence of the logged measurement to the new RAT. The logging indicator informs the availability of the logged measurement upon entering into the new RAT, which is different from informing the availability of the logged measurement upon entering into a new cell regardless of the RAT.

The UE may consider the following conditions in order to transmit the logging indicator to the base station.

(1) Condition related to whether to conserve the logged measurement stored within the UE when a conservation timer starts in the logged measurement when a time remaining until a conservation timer expires is equal to or less than a threshold value when a time remaining until a validity timer expires is equal to or less than a threshold value (2) Condition related to an amount of the logged measurement when the amount of the logged measurement is equal to or higher than a threshold value when a buffer for storing the logged measurement is full when the amount of the logged measurement is equal to or lower than a threshold value (3) Condition related to a content of the logged measurement according to the measurement configuration when the logged measurement includes the measurement result of the serving cell which falls to a threshold value or less when the logged measurement includes the measurement result of the RAT currently camped on by the UE when the logged measurement includes 'out of service' when the logged measurement includes information that a normal camping state is escaped in the idle mode When the logged measurement includes information that a random camping state has been reached from the idle mode. Here, the random camping state is a state in which the UE searches all frequencies of all RATs to find a suitable cell. When the suitable cell is found, the UE enters into the normal camping state.

when the UE camps on a cell of a specific frequency or a frequency having a priority of a specific frequency when the logged measurement includes a measurement result of a specific event, for example, when the UE fails to complete a CS fallback procedure during when performing CSFB and stores information (a wireless environment, a time, a location) about a CSFB failure, or when the UE receives a command for a handover to an inter-RAT but fails to perform successfully, or when the UE receives a command for reconnection to the inter-RAT but fails to perform successfully The above conditions may be applied independently or in combination thereof.

Figure 10:
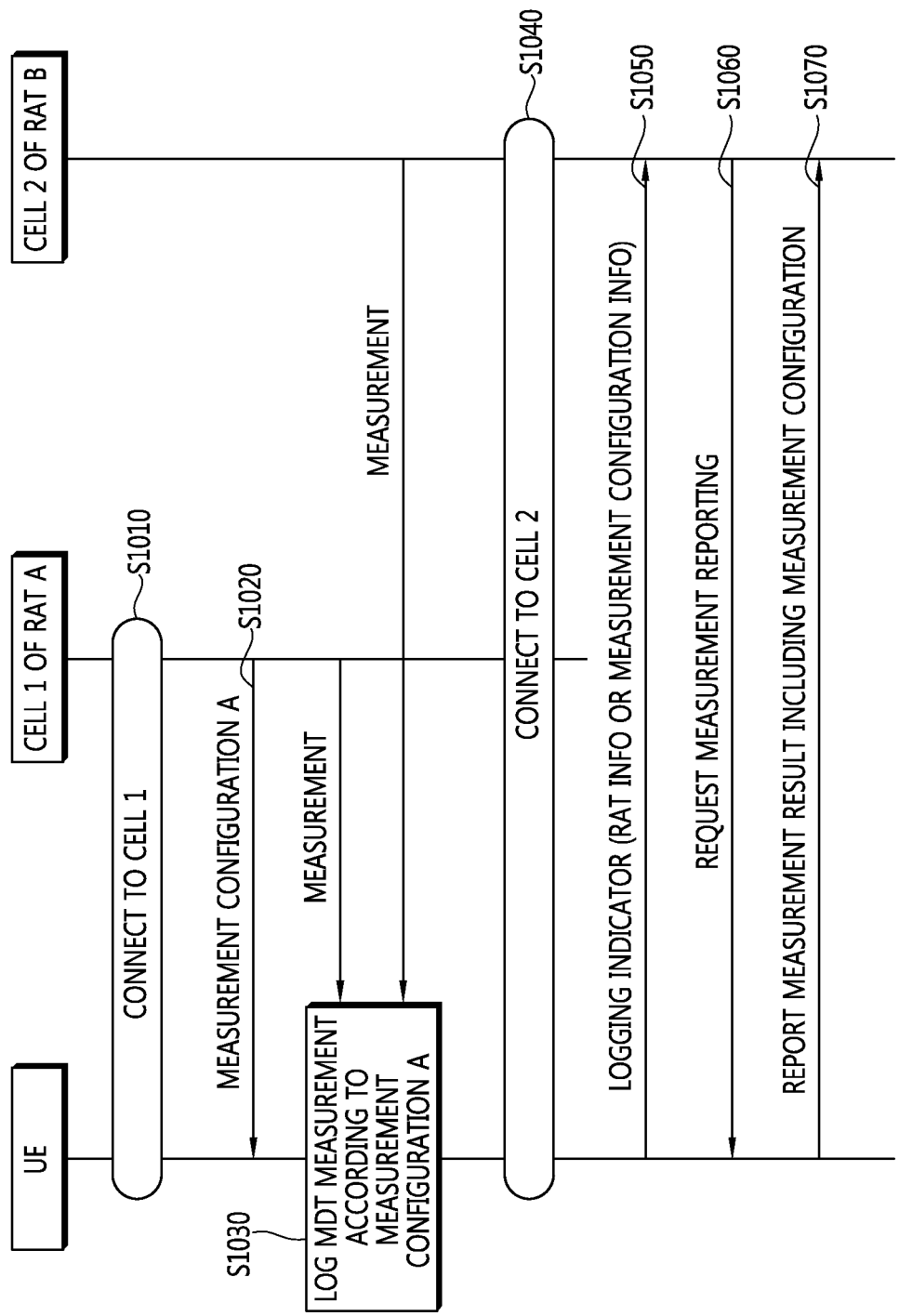
FIG. 10 is a flow chart illustrating a method of reporting logged information according to still another exemplary embodiment of the present invention.

FIG. 10 is a flow chart illustrating a method of reporting logged information according to still another exemplary embodiment of the present invention.

The UE is connected to the cell 1 which uses the RAT A (S1010). The UE receives the measurement configuration from the cell 1 (S1020). The measurement configuration is received from the RAT A and includes a setting about the MDT measurement at the RAT A and the RAT B.

After the UE switches to the RRC idle mode, the UE logs the measurement according to the measurement configuration (S1030).

Next, as the UE moves, the UE is connected to the cell 2 which uses the RAT B (S1040). The UE sends the logging indicator indicating that the logged measurement exists to the cell 2 according to the measurement configuration (S1050). When the UE is connected to another RAT different from the set measurement configuration, the UE informs that the logged measurement exists.

When the RRC connection is established, the RRC connection is re-established, or when the RRC connection is re-configured, the UE may send a logging indicator to the network. For example, when the RRC connection procedure of FIG. 4 is performed, the logging indicator may be included in the RRC connection setup complete message. When an RRC connection re-configuration procedure of FIG. 5 is performed, the logging indicator may be included in an RRC connection re-configuration complete message.

The logging indicator may inform not only whether the logged measurement exists but also RAT information about the RAT which receives the measurement configuration and/or measurement configuration information about the measurement configuration. For example, the logging indicator indicates that the measurement configuration is received from the RAT A.

Alternatively, the RAT information and the measurement configuration information may be transmitted separately from the logging indicator indicating the availability of the logged measurement. The RAT information may be the RAT identifier or the frequency information (e.g., AFRCN). For example, the RAT information and the measurement configuration information may be included in the reporting of the measurement result. When the reporting result has a size too big to be included in a message, the reporting of the measurement result may be divided into two messages. The RAT information and the measurement configuration information may be included in a first message.

The cell 2 requests the reporting of the logged measurement (S1060). The UE reports the reporting result including the measurement configuration and the logged measurement to the cell 2 (S1070). The cell 2 does not know by which measurement configuration the logged measurement is logged such that the measurement configuration is included in the measurement result.

When the base station receives whether the result of the MDT measurement according to the measurement configuration of another RAT exists, the base station determines whether to collect the result of the MDT measurement according to an operation policy of the base station. The operation policy of the base station may be such that the base station requests an instruction as to collection of the measurement result to an upper network node (e.g. MME or a separate network node which collects the measurement result). Here, it may be informed of which RAT the measurement configuration is used for the MDT measurement result. Alternatively, the base station may determine whether to collect the MDT measurement result from a corresponding UE by considering a traffic circumstance of the network. If the base station determines to collect the MDT measurement result according to the measurement configuration, the base station requests the reporting of the measurement result to the UE.

Figure 11:
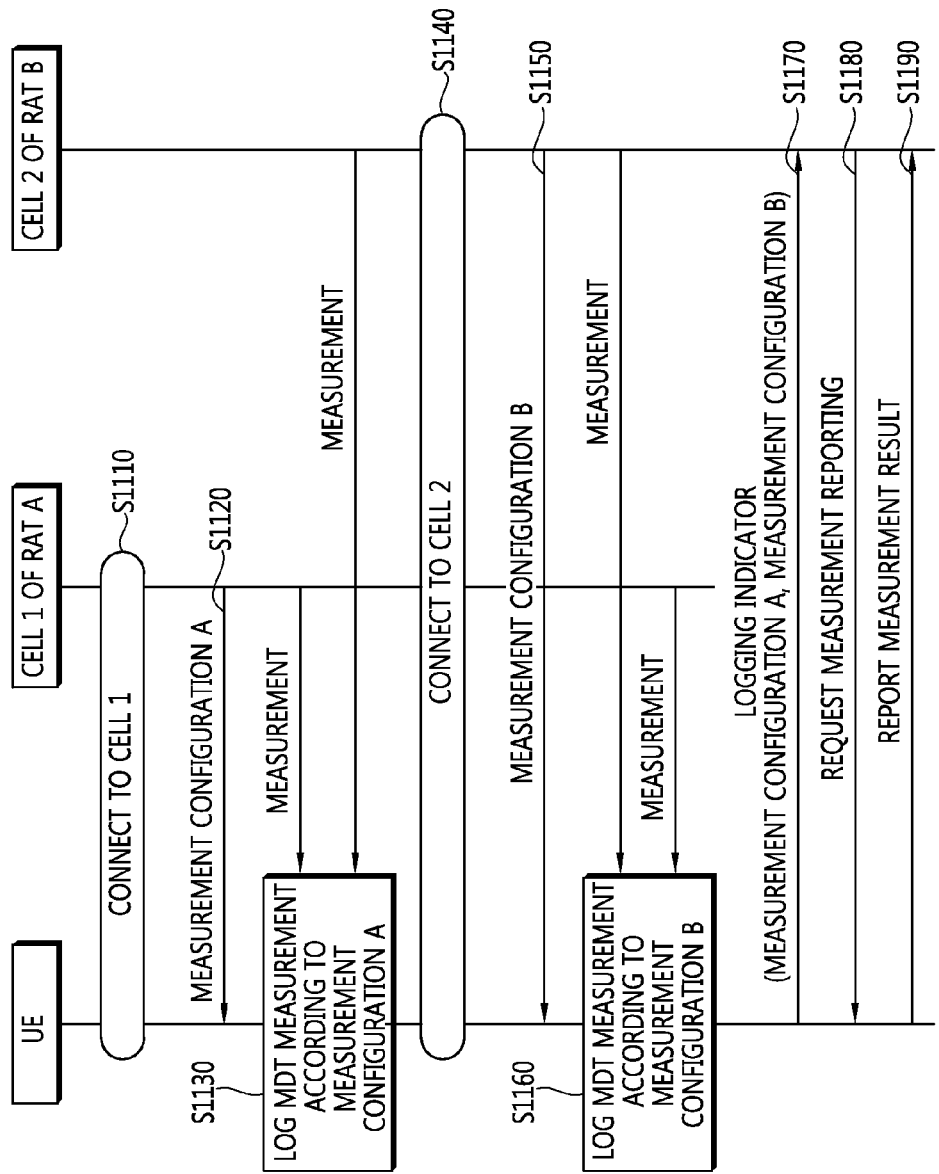
FIG. 11 is a flow chart illustrating a method of reporting logged information according to still another exemplary embodiment of the present invention.

FIG. 11 is a flow chart illustrating a method of reporting logged information according to still another exemplary embodiment of the present invention.

The UE is connected to the cell 1 which uses the RAT A (S1110). The UE receives the measurement configuration A from the cell 1 (S1120). The measurement configuration A is the MDT measurement configuration received from the RAT A and includes setting of the measurement at the RAT A and the RAT B.

After the UE switches to the RRC idle mode, the UE logs the measurement based on the MDT configuration A (S1130).

Next, as the UE moves, the UE is connected to the cell 2 in which the UE uses the RAT B (S1140). The UE receives the measurement configuration B from the cell 2 (S1150). The measurement configuration B is the measurement configuration received from the RAT B and includes setting of measurement when the UE camps on the RAT A and the RAT B.

After the UE switches to the RRC idle mode, the UE logs the measurement based on the MDT configuration B (S1160).

Next, the UE sends the logging indicator indicating that the logged measurement exists according to the measurement configurations A and B to the cell 2 (S1170). Alternatively, the logging indicator may indicate that the logged measurement exists according to the RAT and the RAT B.

When the RRC connection is established, the RRC connection is re-established, or when the RRC connection is re-configured with the cell 2, the UE may send the logging indicator to the network.

The cell 2 requests the reporting of the logged measurement (S1180). The UE reports to the cell 2 the measurement result including the measurement configuration and the logged measurement (S1190).

When the base station requests the reporting of the logged measurement to the UE, a specific measurement configuration (or specific RAT) may be designated such that the UE reports the logged measurement according to the measurement configuration received from the specific RAT. When the specific RAT is not designated within the request for reporting the measurement result, the UE may regard all measurement results according to all stored measurement configurations, i.e., all measurement results according to the measurement configuration respectively received from a plurality of RATs as objects of which measurement needs to be reported.

When the UE reports the measurement configuration, the measurement configuration related to the measurement result reported by the UE may be included in the reporting of the measurement result. The purpose of this is to enable the base station which receives a measurement configuration of another RAT to correctly interpret the reporting of the measurement result of the UE.

Figure 12:
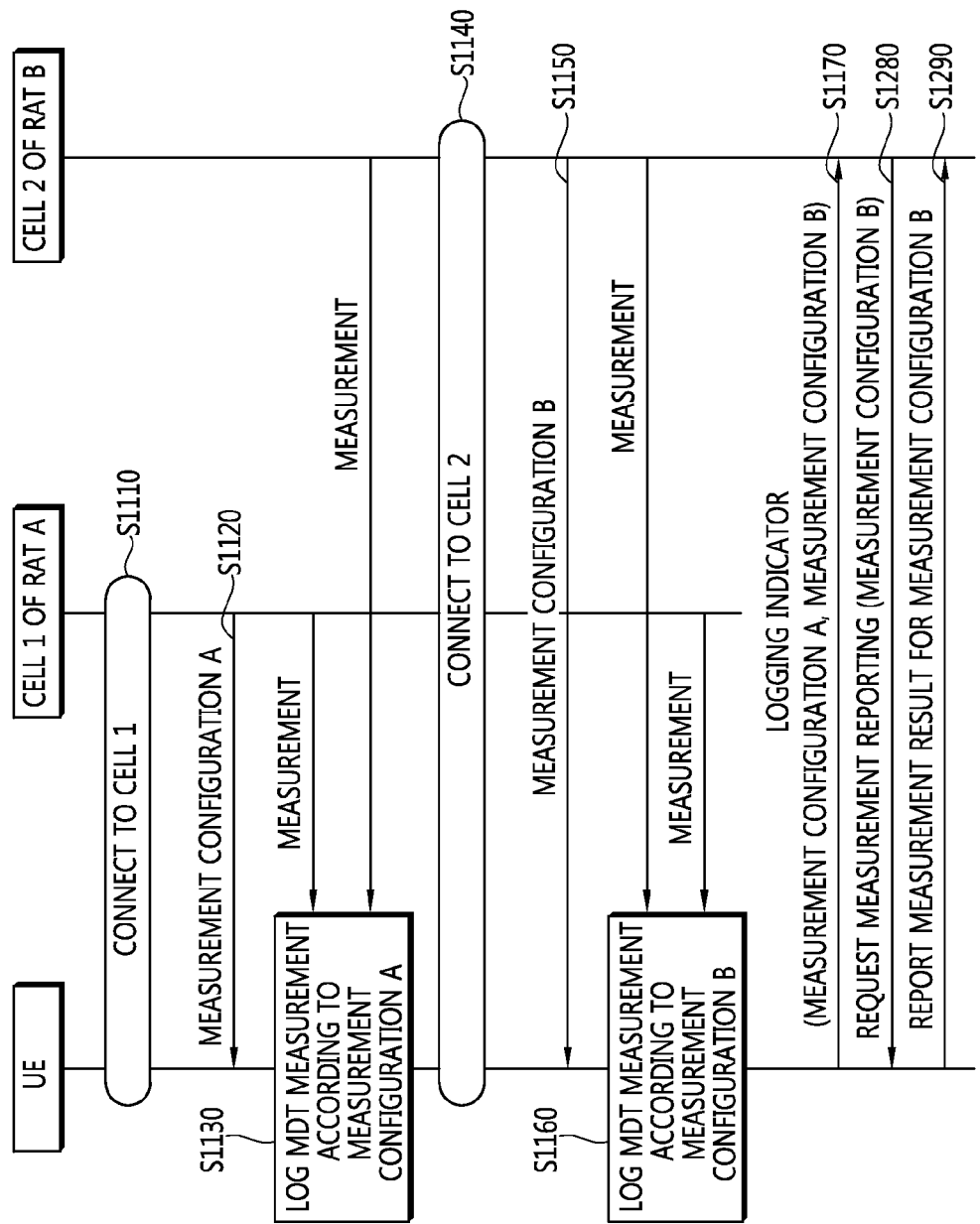
FIG. 12 is a flow chart illustrating a method of reporting logged information according to still another exemplary embodiment of the present invention.

FIG. 12 is a flow chart illustrating a method of reporting logged information according to still another exemplary embodiment of the present invention.

Steps S1110 to S1170 are the same as in the exemplary embodiment of FIG. 11.

The cell 2 which receives the logging indicator indicating that the logged measurement exists from the UE requests the reporting of the measurement result according to the measurement configuration B (or equivalently the measurement configuration received from RAT B) (S1280).

The UE reports the measurement result including the logged measurement according to the measurement configuration B to the cell 2 (S1290).

Figure 13:
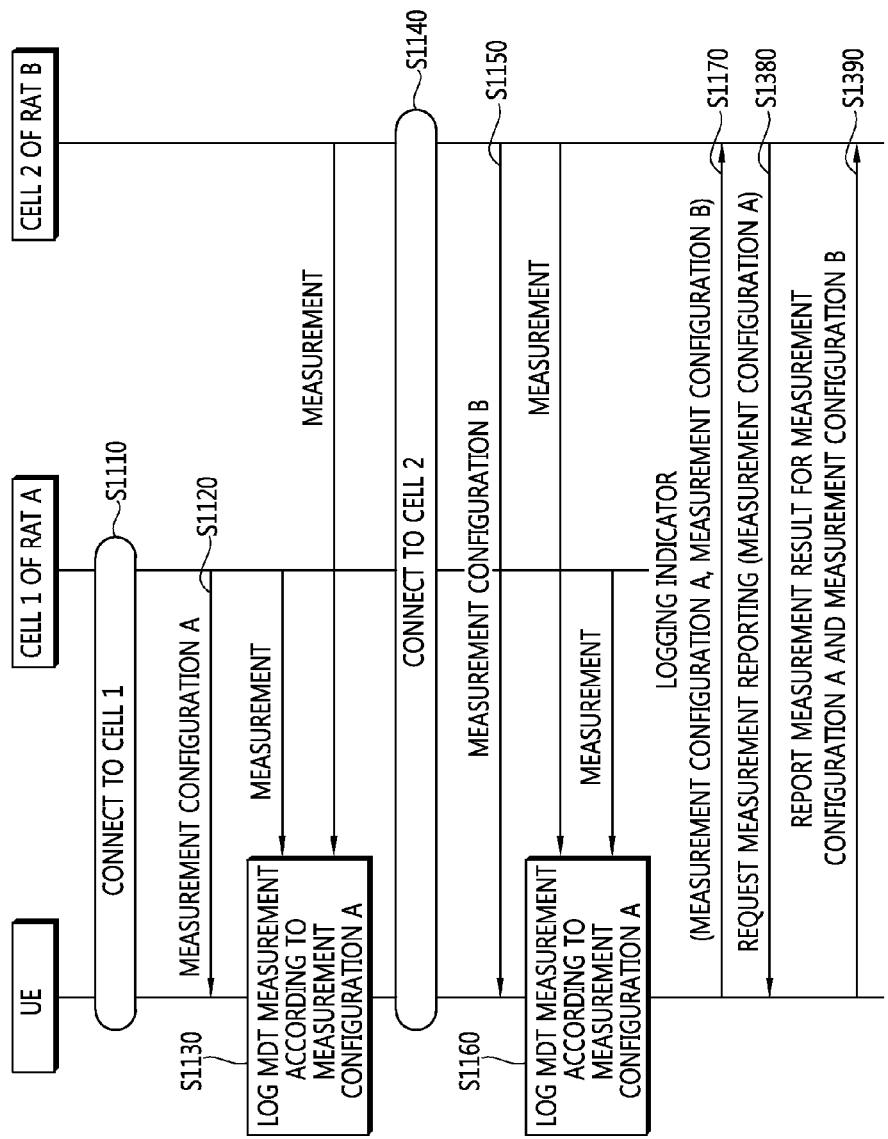
FIG. 13 is a flow chart illustrating a method of reporting logged information according to still another exemplary embodiment of the present invention.

FIG. 13 is a flow chart illustrating a method of reporting logged information according to still another exemplary embodiment of the present invention.

Steps S1110 to S1170 are the same as in the exemplary embodiment of FIG. 11.

The cell 2 which receives the logging indicator indicating the availability of the logged measurement from the UE requests the reporting of the measurement result according to the measurement configuration A (or measurement configuration equivalently received from the RAT A) (S1380).

The UE reports the measurement result including the measurement configuration A and the logged measurement according to the measurement configuration A to the cell 2 (S1390). The cell 2 using the RAT B does not learn about the measurement configuration A, and in order to correctly interpret the logged measurement according to the measurement configuration A, the measurement configuration A is included in the measurement result.

It is described that the above exemplary embodiment is applied to the logged MDT; however, it will be apparent to a person of ordinary skill in the art that the technical spirit of the present invention can also be applied to the immediate MDT.

According to the prior art MDT, when a new measurement configuration is received, the existing measurement configuration is discarded and the measurement result is discarded as well. According to the suggested invention, the measurement configuration previously received from the RAT and the measurement result thereof are conserved. Therefore, the UE may store the logged measurement with respect to a plurality of RATs and the logged measurement may be reported to different RATs.

In the exemplary embodiment described above, the validity timer may be set for each measurement configuration. Alternatively, when one validity timer is set and a new measurement configuration is received, the validity timer may be restarted.

The conservation timer may be operated for each measurement configuration. When the validity timer expires for each measurement configuration, each auxiliary timer may be operated. Alternatively, when one conservation timer is set and the validity timer expires, the conservation timer may be started.

Figure 14:
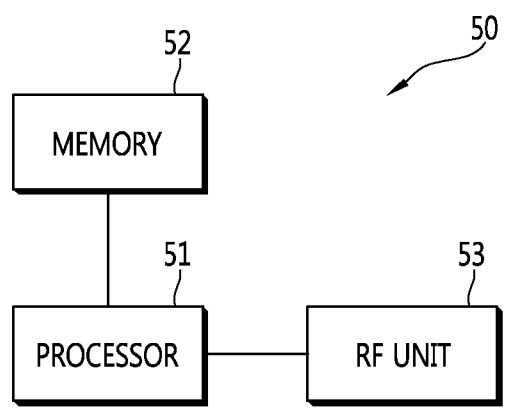
FIG. 14 is a block diagram illustrating a wireless apparatus in which an exemplary embodiment of the present invention is implemented.

FIG. 14 is a block diagram illustrating a wireless apparatus in which an exemplary embodiment of the present invention is implemented. The apparatus implements an operation of the UE of the exemplary embodiments of FIGS. 8 through 13.

A wireless apparatus 50 includes a processor 51, a memory 52, and a radio frequency unit 53. The processor 51 implements a suggested function, process and/or method. The processor 51 may transit between the RRC connection mode and the RRC idle mode and may measure and report the logged MDT based on the MDT configuration. The memory 52 is connected to the processor 51 and may store the MDT configuration and the logged measurement. The exemplary embodiments of FIGS. 8 through 13 described above may be implemented by the processor 51 and the memory 52.

The RF unit 53 is connected to the processor 51 to transmit and receive a wireless signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of reporting logged measurements in a wireless communication system, the method comprising:
receiving, by a user equipment from a cell of a first radio access technology (RAT), a minimization of drive tests (MDT) configuration;
logging, by the user equipment, measurements based on the MDT configuration in order to collect the logged measurements;
transmitting, from the user equipment to a cell of a second RAT, a logging indicator indicating an existence of the logged measurements based on the received MDT configuration from the cell of the first RAT;
receiving, by the user equipment from the cell of the second RAT, a reporting request for reporting the logged measurements,
wherein the reporting request includes information indicating that the MDT configuration is received from the cell of the first RAT,
wherein the reporting request further includes another information related to the first RAT; and
in response to the reporting request, transmitting, by the user equipment to the cell of the second RAT, a measurement result including the logged measurements.

2. The method of claim 1, wherein the user equipment logs the measurements in a radio resource control (RRC) idle mode.

3. The method of claim 2, further comprising:
transitioning, by the user equipment, from the RRC idle mode into an RRC connection mode prior to transmitting the logging indicator.

4. The method of claim 1, wherein the measurement result further includes the MDT configuration.

5. The method of claim 1, wherein the first RAT or the second RAT is one of GSM EDGE Radio Access Network (GERAN), Universal Terrestrial Radio Access Network (UTRAN), and Evolved-UTRAN (E-UTRAN).

6. A wireless apparatus for reporting logged measurements in a wireless communication system, the wireless apparatus comprising:
a radio frequency (RF) unit configured to transmit and receive a radio signal; and
a processor operably connected to the RF unit and configured to:
receive a minimization of drive tests (MDT) configuration from a cell of a first radio access technology (RAT);
log measurements based on the MDT configuration in order to collect the logged measurements;
transmit a logging indicator to a cell of a second RAT, wherein the logging indicator indicates an existence of the logged measurements based on the received MDT configuration from the cell of the first RAT,
receive a reporting request for reporting the logged measurements from the cell of the second RAT,
wherein the reporting request includes information indicating that the MDT configuration is received from the cell of the first RAT,
wherein the reporting request further includes another information related to the first RAT; and
transmit a measurement result including the logged measurements to the cell of the second RAT in response to the reporting request.

7. The wireless apparatus of claim 6, wherein the measurement result further includes the MDT configuration.

8. The wireless apparatus of claim 6, wherein the first RAT or the second RAT is one of GSM EDGE Radio Access Network (GERAN), Universal Terrestrial Radio Access Network (UTRAN), and Evolved-UTRAN (E-UTRAN).

* * * * *